US009607399B2

(12) United States Patent
Behan et al.

(10) Patent No.: US 9,607,399 B2
(45) Date of Patent: Mar. 28, 2017

(54) VIDEO FEED PLAYBACK AND ANALYSIS

(75) Inventors: Gary M. Behan, Phoenix, AZ (US); Hend Dwiyono, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/997,059

(22) PCT Filed: Dec. 21, 2011

(86) PCT No.: PCT/US2011/066571
§ 371 (c)(1),
(2), (4) Date: Mar. 11, 2014

(87) PCT Pub. No.: WO2013/095453
PCT Pub. Date: Jun. 27, 2013

(65) Prior Publication Data
US 2014/0169764 A1    Jun. 19, 2014

(51) Int. Cl.
*G11B 27/00* (2006.01)
*H04N 5/93* (2006.01)
*H04N 9/80* (2006.01)
*G06T 7/20* (2017.01)
*G11B 27/02* (2006.01)
*H04N 9/87* (2006.01)
*H04N 5/262* (2006.01)
*H04N 5/77* (2006.01)

(52) U.S. Cl.
CPC .............. *G06T 7/20* (2013.01); *G06T 7/2033* (2013.01); *G11B 27/02* (2013.01); *H04N 9/87* (2013.01); *G06T 2207/30221* (2013.01); *G06T 2207/30224* (2013.01); *H04N 5/262* (2013.01); *H04N 5/772* (2013.01)

(58) Field of Classification Search
USPC ................. 386/223–224, 239–248, 278–290
See application file for complete search history.

(56) References Cited

U.S. PATENT DOCUMENTS

| 5,111,410 A | 5/1992 | Nakayama et al. |
| 6,514,081 B1 | 2/2003 | Mengoli |
| 7,457,439 B1 | 11/2008 | Madsen et al. |
| 2004/0075738 A1 | 4/2004 | Burke et al. |
| 2004/0096085 A1 | 5/2004 | Matsumoto et al. |

(Continued)

FOREIGN PATENT DOCUMENTS

| CN | 101195072 A | 6/2008 |
| JP | 2004135908 A | 5/2004 |

(Continued)

OTHER PUBLICATIONS

International Preliminary Report on Patentability and Written Opinion received for PCT Patent Application No. PCT/US2011/066571, mailed on Jul. 3, 2014, 6 pages.

(Continued)

*Primary Examiner* — Hung Dang
(74) *Attorney, Agent, or Firm* — Jordan IP Law, LLC

(57) ABSTRACT

Systems and methods may provide for detecting motion of an object, capturing a video feed of the motion, analyzing the video feed according to a predefined characteristic of the motion, and playing back a modified video feed. Analyzing the video feed may include measuring an object motion measurement and generating an object motion metric.

26 Claims, 5 Drawing Sheets

(56) References Cited

U.S. PATENT DOCUMENTS

| | | | |
|---|---|---|---|
| 2004/0147329 A1* | 7/2004 | Meadows | A63B 57/00 473/131 |
| 2005/0013467 A1 | 1/2005 | McNitt | |
| 2005/0272517 A1* | 12/2005 | Funk et al. | 473/222 |
| 2007/0075891 A1* | 4/2007 | Sajima | A63B 24/0021 342/59 |
| 2008/0182685 A1* | 7/2008 | Marty et al. | 473/407 |
| 2009/0069105 A1* | 3/2009 | Holland | A63B 69/3623 473/199 |
| 2011/0276153 A1* | 11/2011 | Selner | 700/91 |
| 2011/0305369 A1 | 12/2011 | Bentley et al. | |

FOREIGN PATENT DOCUMENTS

| | | |
|---|---|---|
| JP | 2004164563 A | 6/2004 |
| JP | 2005210666 A | 8/2005 |
| JP | 2009297240 A | 9/2009 |
| JP | 2009273552 A | 11/2009 |
| KR | 10-2002-0007511 A | 1/2002 |
| KR | 10-2009-0079722 A | 7/2009 |
| WO | 2008023250 A1 | 2/2008 |
| WO | 2008073911 A2 | 6/2008 |
| WO | 2013/095453 A1 | 6/2013 |

OTHER PUBLICATIONS

International Search Report and Written Opinion received for PCT application No. PCT/US2011/066571, mailed on Sep. 24, 2012, 9 pages.

Office Action for Japanese Patent Application No. 2014-548762, dated Aug. 25, 2015, 4 pages, includes 2 pages of English translation.

European Search Report for Patent Application No. 11878036.0, dated Jul. 24, 2015, 8 pages.

Office Action for Chinese Patent Application No. 201180075698.8, mailed on Aug. 30, 2016, 18 pages including 10 pages of English translation.

* cited by examiner

VIDEO FEED PLAYBACK AND ANALYSIS

BACKGROUND

In many settings, the qualitative and quantitative characteristics pertaining to the motion of an object are relevant. However, it is often difficult to analyze and measure these characteristics (e.g., form, velocity) in real time and receive feedback.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Embodiments may involve a computer implemented method including detecting a motion of an object, capturing a video feed of the motion, and analyzing the video feed according to a predefined characteristic of the motion, including measuring an object motion measurement and generating an object motion metric utilizing the object motion measurement. The method may also provide for playing back a modified video feed of the motion, wherein the modified video feed includes a visual representation of at least one of the predefined characteristic of the motion, the object motion measurement and the object motion metric.

Embodiments can also involve a computer readable storage medium including a set of instructions, which, if executed by a processor, cause a computer to detect a motion of an object, capture a video feed of the motion, and analyze the video feed according to a predefined characteristic of the motion, including measuring an object motion measurement and generating an object motion metric utilizing the object motion measurement. The instructions may also cause a computer to play back a modified video feed of the motion, wherein the modified video feed is to include a visual representation of at least one of the predefined characteristic of the motion, the object motion measurement and the object motion metric.

Embodiments can also include an apparatus comprising a camera, a processor; and a memory device having a set of instructions. The set of instructions, if executed by a processor, may cause a computer to detect a motion of an object, capture a video feed of the motion, and analyze the video feed according to a predefined characteristic of the motion, including measuring an object motion measurement and generating an object motion metric utilizing the object motion measurement. The instructions may also cause a computer to play back a modified video feed of the motion, wherein the modified video feed is to include a visual representation of at least one of the predefined characteristic of the motion, the object motion measurement and the object motion metric.

Other embodiments can involve a system including a database and a computing device, wherein the computing device may comprise a camera, a processor, and a memory device. The memory device may comprise a set of instructions which, if executed by a processor, cause a computer to detect motion of an object, capture a video feed of the motion, and analyze the video feed according to a predefined characteristic of the motion, including measuring an object motion measurement and generating an object motion metric utilizing the object motion measurement. The instructions may also cause a computer to play back a modified video feed of the motion, wherein the modified video feed includes a visual representation of at least one of the predefined characteristic of the motion, the object motion measurement and the object motion metric.

Figure 1:
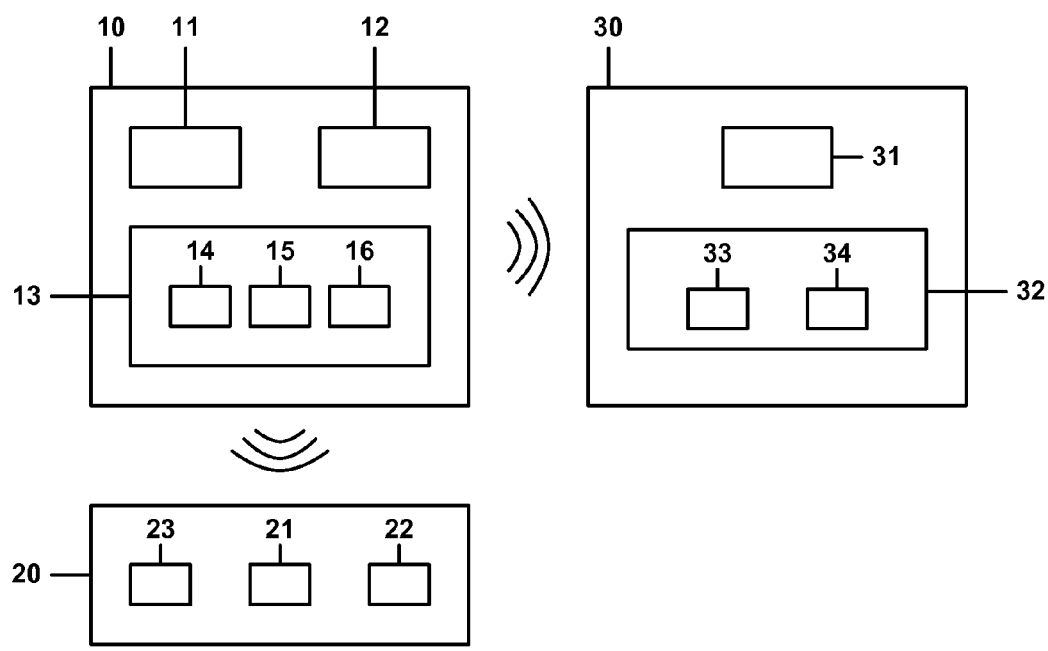
FIG. 1 is a block diagram of a computer system that provides object motion video capture, analysis, and playback in accordance with an embodiment of the invention.

Turning now to FIG. 1, a block diagram of a computer system 1000 that provides motion capture, analysis, and playback is shown. The computer system 1000 may include a first computing device 10, a database 20, and a second computing device 30.

The first computing device 10 may be, among other things, a laptop, desktop, personal digital assistant (PDA), wireless smart phone, media player, imaging device, mobile Internet device (MID), any smart device such as a smart phone, smart tablet, smart TV and so forth, or any combination thereof. The first computing device 10 may include a camera 11, a first computing device processor 12, and a first computing device memory 13.

The camera 11 may be any device configured to capture an image or a video feed (hereinafter collectively referred to as a "video feed") of an object in motion. The first computing device memory 13 may be any device configured to store data. In this case, the first computing device memory 13 may store, among other things, a motion analysis application 14, a first comparison application 15, and a video feed 16 of an object in motion.

As will be discussed in greater detail, the motion analysis application 14 may automatically detect occurrence of an object motion and capture a video feed of the object motion. The motion analysis application 14 may also analyze the video feed, and play back a modified video feed of the object in motion. The first comparison application 15 may compare the quantitative and qualitative aspects of the captured object motion to, for example, an exemplary object motion.

The database 20 may store data. In this case, the database 20 may include, among other things, a motion analysis application update 21, a second comparison application 22, and a data store 23. The motion analysis application update 21 may be a software update to the motion analysis application 14. The data store 23 may be utilized to store, for example, user performance data and previously captured video feeds. Among other things, the motion analysis application 14, the motion analysis application update 21 and the second comparison application 22 may be made available for purchase via download from a database, such as the database 20.

The database 20 may be coupled to the first computing device 10. In this case, the database 20 may be coupled to the first computing device 10 via a wireless data connection (e.g., IEEE 802.11, 1999 Edition, LAN/MAN Wireless LANS (WiFi), IEEE 802.16-2004, LAN/MAN Broadband Wireless LANS (WiMAX), etc.). In other instances, the database may be coupled by a cellular telephone connection (e.g., W-CDMA (UMTS), CDMA2000 (IS-856/IS-2000), etc.), a wired data connection (e.g., RS-232 (Electronic Industries Alliance/EIA), Ethernet (e.g., IEEE 802.3-2005, LAN/MAN CSMA/CD Access Method), power line communication (e.g., X10, IEEE P1675), USB (e.g., Universal Serial Bus 2.0 Specification)), etc., depending upon the circumstances.

The first computing device 10 may be coupled to the second computing device 30 as well. In this instance, the first computing device 10 may be coupled to the second computing device via a cellular telephone connection. The second computing device 30 may be, among other things, a laptop, desktop, personal digital assistant (PDA), wireless smart phone, media player, imaging device, mobile Internet device (MID), any smart device such as a smart phone, smart tablet, smart TV and so forth, or any combination thereof. In this instance, the second computing device 30 may be a desktop computer. The second computing device 30 may include a second computing device processor 31 and a first computing device memory 32. The second computing device memory may store, among other things, a second computing device motion analysis application 33 and a second computing device captured video feed 34.

The arrangement and numbering of blocks depicted in FIG. 1 is not intended to imply an order of operations to the exclusion of other possibilities. Those of skill in the art will appreciate that the foregoing systems and methods are susceptible of various modifications and alterations.

For example, in the embodiment illustrated in FIG. 1, the first computing device 10 has a camera 11 built in, and a captured video feed may be analyzed at the first computing device 10 utilizing the first computing device processor 12 and the first computing device memory 13. However, in other embodiments, this may not be the case. In other embodiment, a user may utilize a video camera to capture a video feed, and later upload the video feed to a computing device, such as the second computing device 30, for analysis and play back by a locally stored motion analysis application, such as the second computing device motion analysis application 33.

Figure 2:
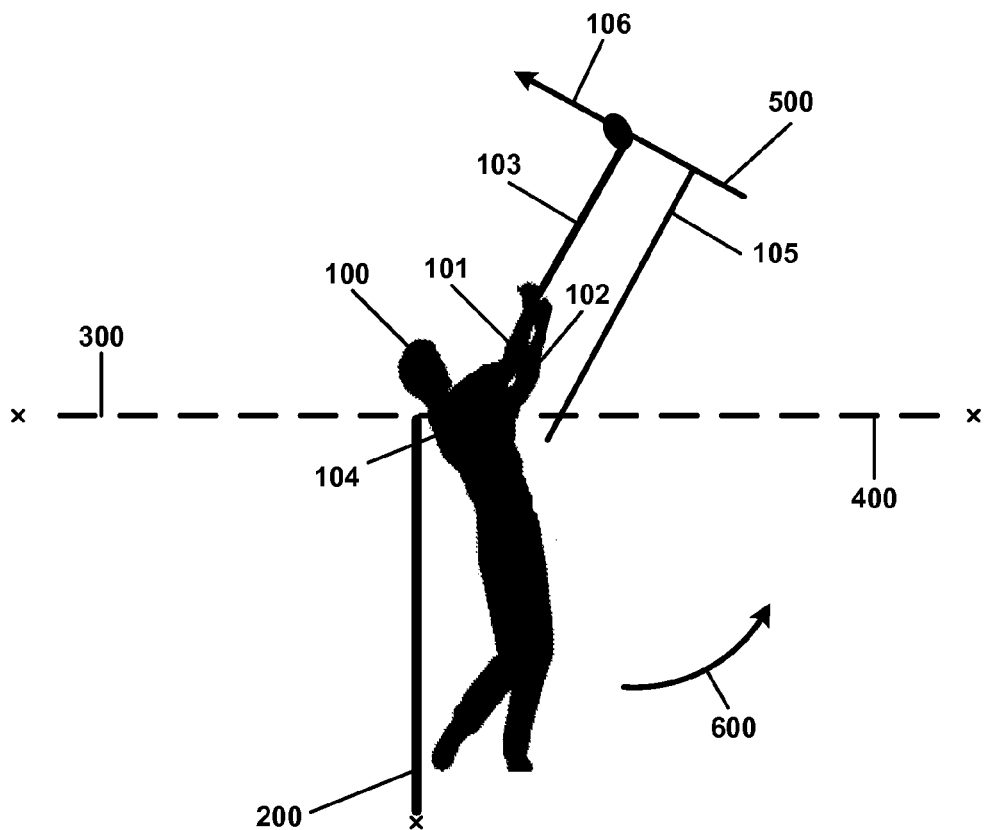
FIG. 2 is a diagram indicating various features of a motion analysis application in accordance with an embodiment of the invention.

FIG. 2 illustrates various examples of features of a motion analysis application. In this example, the object whose motion is to be analyzed is a user 100 whose goal is to practice her golf swing. FIG. 2 illustrates a first user arm 101, a second user arm 102, and a golf club 103. In this example, the user may utilize a motion analysis application, such as the motion analysis application 14 (FIG. 1), to detect the motion of the user 100 and capture a video feed of the motion of the user 100.

Furthermore, the motion analysis application may, among other things, analyze the motion of an object according to a predefined characteristic of the object's motion in real time. For example, in the case of golf, the predefined characteristic of the motion of the user 100 may be the circular golf swing that the user 100 engages in during a stroke. In the case of football, the predefined characteristic of the user's motion may be a throwing motion arc that a user uses when passing a football.

A motion analysis application may further be configured to recognize the relevant motion points related to the object's motion. The motion points may include various relevant points in defining the object's motion. For example, if the case of user 100, a motion analysis application may be configured to recognize an axis 104, a lever 105, and an endpoint 106. In this instance, the axis 104 may be the shoulder blade of the user 100 nearest to the camera. However, depending on the type of motion, the axis 104 may also or otherwise be a fulcrum, pivot, or a center.

Also, in this instance, the lever 105 may be the sum of the length from the axis 104 to the end of the user's first arm 101 and the user's second arm 102 (i.e., the user's hands), and the length of the golf club 103. However, depending on the type of motion, the lever 105 may otherwise be the length of an arm and a racket (e.g., if the user is playing tennis), or may be simply the length of an arm (e.g., if the user is playing football).

In this example, the endpoint may be the endpoint 106 of the golf club 103. However, depending on the type of motion, the lever 105 may otherwise be the endpoint of a racket (e.g., if the user is playing tennis), or may be simply the user's hand (e.g., if the user is playing football).

A motion analysis application may also be configured to make various motion measurements. As will be discussed in greater detail, motion measurements may include a distance, a velocity, an acceleration/deceleration, a direction, and any other measurements relevant to the motion of a particular object.

A first such measurement may be a baseline distance. A baseline distance may be a distance relevant to a start point of an object's motion. In this case, the baseline distance 200 may be the distance from the axis 104 to the endpoint 106 as the user sets up to drive the golf ball.

A second measurement may be a motion portion distance, which may represent a distance measurement made while an object is in motion. In this case, the first motion portion distance 300 may represent a measured distance during the user's full extension in a golf back swing. Similarly, the motion analysis application may measure a second motion portion distance 400 as well, which may represent a distance during the user's full extension in a golf forward swing.

A motion analysis application may also measure linear velocity and angular velocity of an object. In this case, the linear velocity measurement 500 may represent the linear speed of the club head during the golf swing, while the angular velocity 600 may represent the angular speed at which the user moves through the golf swing.

In other use cases, other distance measurements may be made as well. For example, an action distance may be measured at a point or moment a particular action or event takes place during an object's motion. So, in the case of analyzing a football pass, an action distance may be measured at the point of the release of the football. More specifically, the action distance may represent the distance between the user's shoulder blade and the user's hand at the point of release.

A motion analysis application may also be configured to make measurements of the object's body parts as they pertain to the motion. For example, in this case, a motion analysis application may measure the distance that user's hips, elbows, or knees move during a golf driving motion.

In addition to making motion measurements, a motion analysis application may also be configured to generate various motion metrics. For example, a motion analysis application may generate a first motion ratio and a second motion ratio. In the present case, the first motion ratio may be the ratio of the first motion portion distance 300 and the baseline distance 200, while the second motion ratio may be the ratio of the second motion portion distance 400 and the baseline distance 200. So for example, if the first motion portion distance 300 may be 70 inches, the second motion portion distance 400 may be 120 inches, and the baseline distance 200 may be 100 inches, then a motion analysis application may calculate that the first motion ratio may be 70% and the second motion ratio may be 120%.

A motion analysis application may also generate a motion plane metric to analyze the integrity and uniformity of an object's motion as it travels through a plane. In this case, the integrity and uniformity of the user's swing may be measured by determining in-line variances with respect to the motion plane.

Furthermore, a motion analysis application may utilize a motion measurement and a motion metric to generate a qualitative and quantitative indicator. For example, a motion analysis application may utilize multiple motion measurements and motion metrics over a plurality of use cases to generate a consistency metric describing the consistency of an object's motion over the plurality of use cases.

Moreover, in some cases, a motion analysis application may access a remote data store, such as the data store 23 (FIG. 1), to supplement an analysis of an object's motion. For example, in the present case, a motion analysis application may download motion metrics and motion measurements from the remote data store to supplement determination of a consistency ratio.

A motion analysis application may upload information to the remote data store for storage as well. For example, upon completion of a use session, a motion analysis application may upload all of the relevant information from the use session for future use. Similarly, any relevant information from gathered by a motion analysis application may be shared through social media sites, or shared directly with others.

Also, for example, a motion analysis application may also be configured to take determined measurements and calculated metrics and compare them to other sets of similar measurements and metrics. For example, in the present case, a motion analysis application may access a comparison application, such as the first comparison application 15 (FIG. 1), to compare the golf swing of the user 100 to a professional golfer's (e.g., Tiger Woods) golf swing. A motion analysis application may also utilize the comparison analysis to generate a compared motion metric.

In a similar vein, in the case of human beings, a motion analysis application may access a data store to access optimal motion measurements and motion metrics for a user's body type, weight, and height (among other things). So, in the present case, a motion analysis application may utilize measurements and metrics for the user 100, a set of accessed optimal motion measurements, and a comparison application to compare the golf swing of the user 100 to an optimal golf swing. The motion analysis application may also utilize the comparison to generate an optimal motion metric.

Also in a similar vein, a motion analysis application may also utilize, among other things, a motion measurement, a motion metric, or a consistency metric to generate an overall performance metric. The overall performance metric may be determined over a single use session, or over multiple use sessions.

A motion analysis application may also supplement its analysis utilizing information from Global Positioning System (GPS) and other similar location determination systems and applications. For example, in this case, when the user 100 is playing a particular course or hole, a motion analysis application may utilize GPS information to determine the identity of the particular hole. It may then, for example, utilize that information to access information from a data store indicating that the user played the same hole two months before.

A motion analysis application may be configured to intelligently differentiate between the types of motion captured in the video feed. For example, in this case, a motion analysis application may be configured to differentiate between a major (i.e., important or relevant) motion as pertaining to a golf swing (e.g., the swing of the club, the flight path of the ball, etc.), and a minor motion as pertaining to a golf swing (e.g., a golf tee flying in the air).

Similarly, a motion analysis application may also be configured to intelligently differentiate between the types of objects captured in the video feed. So, for example, in this case, a motion analysis application may be configured to differentiate between a major (or important) object in analyzing a golf swing (e.g., a golf club, a golf ball), and a relatively unimportant object (e.g., a golf tee, a flying bird).

A motion analysis application may also be configured to provide playback of a captured video feed, and provide intelligent feedback to the user. As discussed above, a motion analysis application may be configured to analyze the captured video feed to, among other things, track an object's motion, determine various measurements, and generate various metrics. So, upon playback, a motion analysis application may incorporate these measurements, metrics, and indicators (among other things) into a modified video feed to provide rich visual feedback to a user during playback.

For example, in the instant case of the user 100, a motion analysis application may incorporate into the video feed a major motion line (e.g., in a blue color) indicating the swing path of the golf club, and a major motion line (e.g., in a red color) indicating the flight path of the ball. Also, a motion analysis application may show various visual objects indicating, for example, a baseline distance (e.g., indicated by a colored line) or a first motion ratio (e.g., indicated by a percentage).

Figure 3:
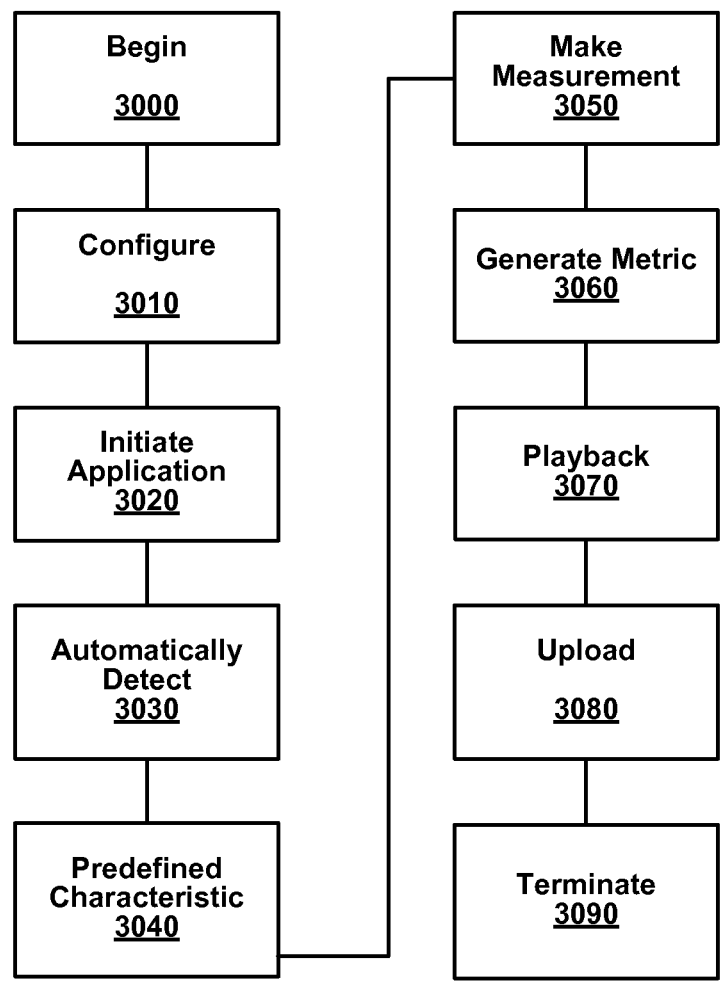
FIG. 3 is a flowchart of an example of a method of providing object motion video capture, analysis, and playback in accordance with an embodiment of the invention.

Turning now to FIG. 3, a flowchart of a method of providing motion video feed playback and analysis in accordance with an embodiment of the invention is shown. The method might be implemented as a set of logic instructions stored in a machine- or computer-readable storage medium such as random access memory (RAM), read only memory (ROM), programmable ROM (PROM), firmware, flash memory, etc., in configurable logic such as programmable logic arrays (PLAs), field programmable gate arrays (FPGAs), complex programmable logic devices (CPLDs), in fixed-functionality logic hardware using circuit technology such as application specific integrated circuit (ASIC), complementary metal oxide semiconductor (CMOS) or transistor-transistor logic (TTL) technology, or any combination thereof. For example, computer program code to carry out operations shown in the method may be written in any combination of one or more programming languages, including an object oriented programming language such as Java, Smalltalk, C++ or the like and conventional procedural programming languages, such as the "C" programming language or similar programming languages.

In this example, the object whose motion is to be analyzed is a user whose goal is to practice her golf swing. The user may be using a wireless smart phone with a camera to capture video feed of her golf swing(s).

The process may begin at processing block 3000. At processing block 3010, the user may configure the wireless smart phone and its camera to capture video feed of her golf swing(s). At processing block 3020, she may initiate a motion analysis application, such as the motion analysis application 14 (FIG. 1). At processing block 3030, upon her first swing, the motion analysis application may automatically detect the user's swing. At processing block 3040, the motion analysis application may analyze the video feed to according to a predefined characteristic. In this case, the predefined characteristic of the motion may be a circular swinging motion of a golf drive. At processing block 3050, the motion analysis application may analyze the captured video feed to make various measurements, including a base line distance and a first motion portion distance. At processing block 3060, the motion analysis application may generate a metric, such as a first motion ratio. At processing block 3070, the motion analysis application may play back a modified video feed of the user's swing, including objects representing the golf swing, the base line distance, the first motion portion distance, and the first motion ratio. At processing block 3080, the motion application may upload information generated by the motion analysis application (e.g., the modified video feed, the base line distance, the first motion ratio) to a data store, such as the data store 23 (FIG. 1). At processing block 3090, the process may terminate.

The sequence and numbering of blocks depicted in FIG. 3 is not intended to imply an order of operations to the exclusion of other possibilities. Those of skill in the art will appreciate that the foregoing systems and methods are susceptible of various modifications, variations, and alterations.

For example, in the embodiment described in FIG. 3, the example pertains to a user swinging a golf club once in a one particular session. However, as discussed above, this need not necessarily be the case. In another case, a user may utilize a motion analysis application to determine qualitative and quantitative characteristics of her golf swing over multiple swings, and multiple sessions. In doing so, the method may also be able to, among other things, generate a consistency metric or an overall performance metric.

Moreover, in the embodiment described in FIG. 3, the use case is a person practicing an aspect of a sport (i.e., a golf swing). However, as discussed above, this need not necessarily be the case. The methods and systems described may be applicable to many other contexts as well. Indeed, the methods and systems may be applicable to any type of motion where qualitative (e.g., form) and quantitative (e.g., velocity) characteristics of the motion are relevant. So, for example, embodiments of the present invention may be applied to machine motion (e.g., a robotic arm) to determine characteristics and deficiencies of the machine's motions.

Figure 4:
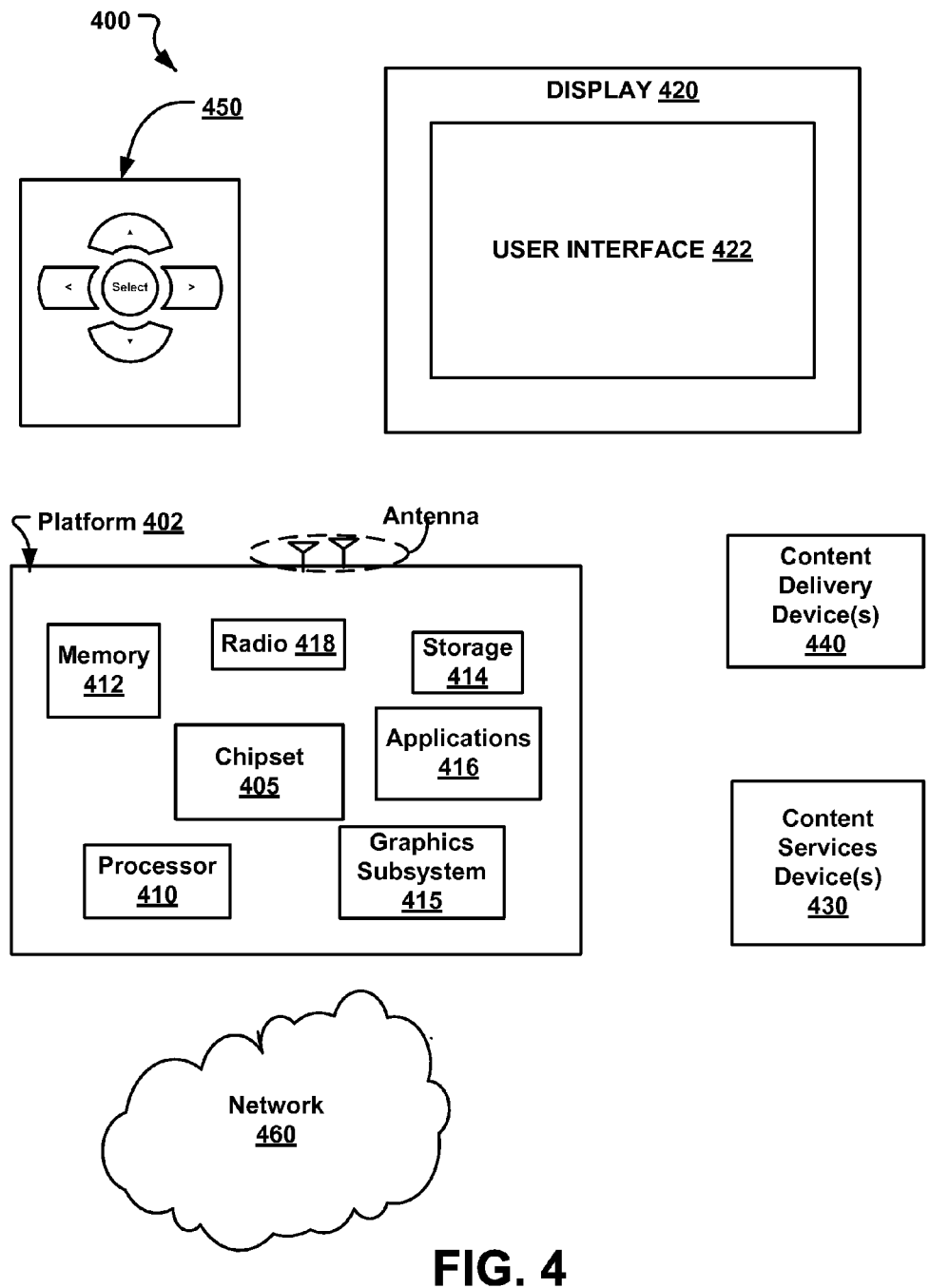
FIG. 4 is a block diagram of a computer system in accordance with an embodiment of the invention.

FIG. 4 illustrates an embodiment of a system 400. In embodiments, system 400 may be a media system although system 400 is not limited to this context. For example, system 400 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 400 comprises a platform 402 coupled to a display 420. Platform 402 may receive content from a content device such as content services device(s) 430 or content delivery device(s) 440 or other similar content sources. A navigation controller 450 comprising one or more navigation features may be used to interact with, for example, platform 402 and/or display 420. Each of these components is described in more detail below.

In embodiments, platform 402 may comprise any combination of a chipset 405, processor 410, memory 412, storage 414, graphics subsystem 415, applications 416 and/or radio 418. Chipset 405 may provide intercommunication among processor 410, memory 412, storage 414, graphics subsystem 415, applications 416 and/or radio 418. For example, chipset 405 may include a storage adapter (not depicted) capable of providing intercommunication with storage 414.

Processor 410 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 410 may comprise dual-core processor(s), dual-core mobile processor(s), and so forth.

Memory 412 may be implemented as a volatile memory device such as, but not limited to, a Random Access Memory (RAM), Dynamic Random Access Memory (DRAM), or Static RAM (SRAM).

Storage 414 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 414 may comprise technology to increase the storage performance enhanced protection for valuable digital media when multiple hard drives are included, for example.

Graphics subsystem 415 may perform processing of images such as still or video for display. Graphics subsystem 415 may be a graphics processing unit (GPU) or a visual processing unit (VPU), for example. An analog or digital interface may be used to communicatively couple graphics subsystem 415 and display 420. For example, the interface may be any of a High-Definition Multimedia Interface, DisplayPort, wireless HDMI, and/or wireless HD compliant techniques. Graphics subsystem 415 could be integrated into processor 410 or chipset 405. Graphics subsystem 415 could be a stand-alone card communicatively coupled to chipset 405.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 418 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 418 may operate in accordance with one or more applicable standards in any version.

In embodiments, display 420 may comprise any television type monitor or display. Display 420 may comprise, for example, a computer display screen, touch screen display, video monitor, television-like device, and/or a television. Display 420 may be digital and/or analog. In embodiments, display 420 may be a holographic display. Also, display 420 may be a transparent surface that may receive a visual projection. Such projections may convey various forms of information, images, and/or objects. For example, such projections may be a visual overlay for a mobile augmented reality (MAR) application. Under the control of one or more software applications 416, platform 402 may display user interface 422 on display 420.

In embodiments, content services device(s) 430 may be hosted by any national, international and/or independent service and thus accessible to platform 402 via the Internet, for example. Content services device(s) 430 may be coupled to platform 402 and/or to display 420. Platform 402 and/or content services device(s) 430 may be coupled to a network 460 to communicate (e.g., send and/or receive) media information to and from network 460. Content delivery device(s) 440 also may be coupled to platform 402 and/or to display 420.

In embodiments, content services device(s) 430 may comprise a cable television box, personal computer, network, telephone, Internet enabled devices or appliance capable of delivering digital information and/or content, and any other similar device capable of unidirectionally or bidirectionally communicating content between content providers and platform 402 and/display 420, via network 460 or directly. It will be appreciated that the content may be communicated unidirectionally and/or bidirectionally to and from any one of the components in system 400 and a content provider via network 460. Examples of content may include any media information including, for example, video, music, medical and gaming information, and so forth.

Content services device(s) 430 receives content such as cable television programming including media information, digital information, and/or other content. Examples of content providers may include any cable or satellite television or radio or Internet content providers. The provided examples are not meant to limit embodiments of the invention.

In embodiments, platform 402 may receive control signals from navigation controller 450 having one or more navigation features. The navigation features of controller 450 may be used to interact with user interface 422, for example. In embodiments, navigation controller 450 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 450 may be echoed on a display (e.g., display 420) by movements of a pointer, cursor, focus ring, or other visual indicators displayed on the display. For example, under the control of software applications 416, the navigation features located on navigation controller 450 may be mapped to virtual navigation features displayed on user interface 422, for example. In embodiments, controller 450 may not be a separate component but integrated into platform 402 and/or display 420. Embodiments, however, are not limited to the elements or in the context shown or described herein.

In embodiments, drivers (not shown) may comprise technology to enable users to instantly turn on and off platform 402 like a television with the touch of a button after initial boot-up, when enabled, for example. Program logic may allow platform 402 to stream content to media adaptors or other content services device(s) 430 or content delivery device(s) 440 when the platform is turned "off." In addition, chip set 405 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 400 may be integrated. For example, platform 402 and content services device(s) 430 may be integrated, or platform 402 and content delivery device(s) 440 may be integrated, or platform 402, content services device(s) 430, and content delivery device(s) 440 may be integrated, for example. In various embodiments, platform 402 and display 420 may be an integrated unit. Display 420 and content service device(s) 430 may be integrated, or display 420 and content delivery device(s) 440 may be integrated, for example. These examples are not meant to limit the invention.

In various embodiments, system 400 may be implemented as a wireless system, a wired system, or a combination of both. When implemented as a wireless system, system 400 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 400 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 402 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 4.

Figure 5:
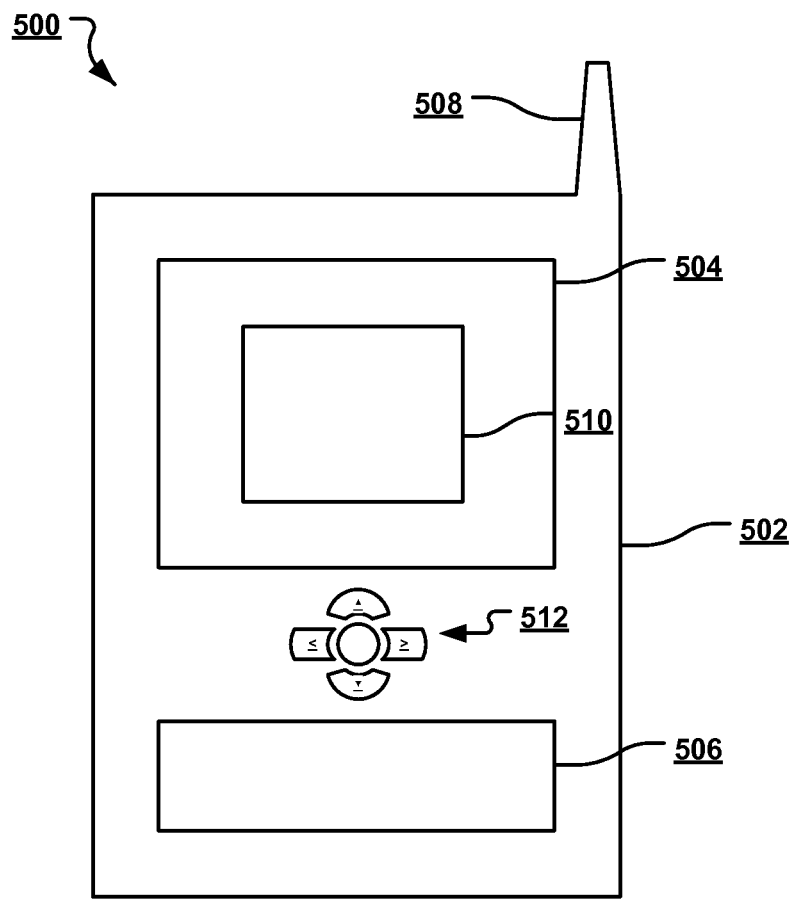
FIG. 5 is a block diagram of a small form factor device in accordance with an embodiment of the invention.

As described above, system 400 may be embodied in varying physical styles or form factors. FIG. 5 illustrates embodiments of a small form factor device 500 in which system 400 may be embodied. In embodiments, for example, device 500 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 5, device 500 may comprise a housing 502, a display 504, an input/output (I/O) device 506, and an antenna 508. Device 500 also may comprise navigation features 512. Display 504 may comprise any suitable display unit for displaying information appropriate for a mobile computing device. I/O device 506 may comprise any suitable I/O device for entering information into a mobile computing device. Examples for I/O device 506 may include an alphanumeric keyboard, a numeric keypad, a touch pad, input keys, buttons, switches, rocker switches, microphones, speakers, voice recognition device and software, and so forth. Information also may be entered into device 500 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Techniques described herein may therefore provide a feed-forward system that ensures both real-time operation of the consumer video pipeline and dynamic updating of the operating pipeline to deliver optimal visual perceptual quality and viewing experience. In particular, a discrete control system for the video pipeline can dynamically adapt operating points in order to optimize a global configuration of interactive component modules that are related to video perceptual quality. In a series configuration, the perceptual quality analysis module may be placed before the video processing pipeline and parameters determined for the post-processing pipeline may be used for the same frame. In the case of distributed computation of the quality analysis block or when perceptual quality analysis needs to be performed at intermediate points in the pipeline, the parameters determined using a given frame may be applied on the next frame to ensure real-time operation. Distributed computation is sometimes beneficial in reducing complexity as certain elements for perceptual quality computation may already be computed in the post-processing pipeline and can be re-used. Illustrated approaches may also be compatible with closed-loop control where the perceptual quality analysis is re-used at the output of the video processing pipeline to estimate output quality, which is also used by the control mechanism.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A computer implemented method comprising:
   detecting a motion of one or more of a user or an object;
   capturing a video feed of the motion;
   analyzing the video feed according to a predefined characteristic of the motion, including measuring an object motion measurement and generating an object motion metric utilizing the object motion measurement; and
   playing back a modified video feed of the motion, wherein the modified video feed includes a visual representation of at least one of the predefined characteristic of the motion, the object motion measurement and the object motion metric,
   wherein a user motion measurement and a user motion metric are obtained from the captured video feed and are compared to optimal motion measurements and optimal motion metrics for one or more of a body type, a height or a weight of the user, and an optimal indicator is generated based on a result of the comparing,
   wherein analyzing the video feed according to the predefined characteristic of the motion includes differentiating between a major motion that is involved in the generating of the object motion metric and a minor motion that is not involved in the generating of the object motion metric,
   wherein a remote data store is accessed to obtain parameters to supplement a determination of a consistency ratio of the motion of the object,
   wherein a motion analysis application update is downloaded from a remote database, and
   wherein the user motion measurement includes a base line distance, a first motion portion distance representing a first motion of the user, and a second motion portion distance representing a second motion of the user, wherein a first motion ratio is calculated based on the base line distance and the first motion portion, and wherein a second motion ratio is calculated based on the base line distance and the second motion portion.

2. The computer implemented method of claim 1, wherein analyzing the video feed according to the predefined characteristic of the motion further includes differentiating between a major object and a minor object.

3. The computer implemented method of claim 1, wherein analyzing the video feed according to the predefined characteristic of the motion further includes recognizing a motion point.

4. The computer implemented method of claim 3, wherein the motion point is one of an axis, a lever, and an endpoint.

5. The computer implemented method of claim 1, further including uploading at least one of the video feed, the object motion measurement, the object motion metric, and the modified video feed to the remote database.

6. The computer implemented method of claim 1, further including downloading a comparison application from the remote database.

7. The computer implemented method of claim 1, further including determining a location of the object.

8. The computer implemented method of claim 1, wherein the object motion measurement is one of the base line distance, an action distance, the first motion portion distance, the second motion portion distance, a linear velocity and an angular velocity.

9. The computer implemented method of claim 1, wherein the object motion metric is one of a motion ratio, an optimal motion metric, a motion plane metric, and an overall performance metric.

10. A non-transitory computer readable storage medium comprising a set of instructions which, if executed by a processor, cause a computer to:
    detect a motion of one or more of a user or an object;
    capture a video feed of the motion;
    analyze the video feed according to a predefined characteristic of the motion, including measuring an object motion measurement and generating an object motion metric utilizing the object motion measurement; and play back a modified video feed of the motion, wherein the modified video feed is to include a visual representation of at least one of the predefined characteristics of the motion, the object motion measurement and the object motion metric, wherein a user motion measurement and a user motion metric are obtained from the captured video feed and are compared to optimal motion measurements and optimal motion metrics for one or more of a body type, a height or a weight of the user, and an optimal indicator is generated based on a result of the comparing, wherein analyzing the video feed according to the predefined characteristic of the motion includes differentiating between a major motion that is involved in the generating of the object motion metric and a minor motion that is not involved in the generating of the object motion metric, wherein a remote data store is to be accessed to obtain parameters to supplement a determination of a consistency ratio of the motion of the object, wherein a motion analysis application update is to be downloaded from a remote database, and wherein the user motion measurement is to include a base line distance, a first motion portion distance representing a first motion of the user, and a second motion portion distance representing a second motion of the user, wherein a first motion ratio is to be calculated based on the base line distance and the first motion portion, and wherein a second motion ratio is to be calculated based on the base line distance and the second motion portion.

11. The medium of claim 10, wherein analyzing the video feed according to the predefined characteristic of the motion further includes differentiating between a major object and a minor object.

12. The medium of claim 10, wherein analyzing the video feed according to the predefined characteristic of the motion further includes recognizing a motion point.

13. The medium of claim 12, wherein the motion point is one of an axis, a lever, and an endpoint.

14. The medium of claim 10, further comprising uploading at least one of the video feed, the object motion measurement, the object motion metric, and the modified video feed to the remote database.

15. The medium of claim 10, further comprising downloading one of a motion analysis application, and a comparison application from the remote database.

16. The medium of claim 10, further comprising determining a location of the object.

17. The medium of claim 10, wherein the object motion measurement is one of the base line distance, an action distance, the first motion portion distance, the second motion portion distance, a linear velocity and an angular velocity.

18. The medium of claim 10, wherein the object motion metric is one of a motion ratio, an optimal motion metric, a motion plane metric, and an overall performance metric.

19. An apparatus comprising:
a camera;
a processor; and
a memory device comprising a set of instructions which, if executed by a processor, cause a computer to:
detect a motion of one or more of a user or an object;
capture a video feed of the motion;
analyze the video feed according to a predefined characteristic of the motion, including measuring an object motion measurement and generating an object motion metric utilizing the object motion measurement; and
play back a modified video feed of the motion, wherein the modified video feed is to include a visual representation of at least one of the predefined characteristics of the motion, the object motion measurement and the object motion metric, wherein a user motion measurement and a user motion metric are obtained from the captured video feed and are compared to optimal motion measurements and optimal motion metrics for one or more of a body type, a height or a weight of the user, and an optimal indicator is generated based on a result of the comparing, wherein analyzing the video feed according to the predefined characteristics of the motion includes differentiating between a major motion that is involved in the generating of the object motion metric and a minor motion that is not involved in the generating of the object motion metric, wherein a remote data store is to be accessed to obtain parameters to supplement a determination of a consistency ratio of the motion of the object, wherein a motion analysis application update is to be downloaded from a remote database, and wherein the user motion measurement is to include a base line distance, a first motion portion distance representing a first motion of the user, and a second motion portion distance representing a second motion of the user, wherein a first motion ratio is to be calculated based on the base line distance and the first motion portion, and wherein a second motion ratio is to be calculated based on the base line distance and the second motion portion.

20. The apparatus of claim 19, wherein analyzing the video feed according to the predefined characteristic of the motion further includes differentiating between a major object and a minor object.

21. The apparatus of claim 19, wherein analyzing the video feed according to the predefined characteristic of the motion further includes recognizing a motion point.

22. The apparatus of claim 19, wherein the set of instructions further cause the computer to upload at least one of the video feed, the object motion measurement, the object motion metric, and the modified video feed to the remote database.

23. A system comprising:
a database; and
a computer device comprising:
a camera;
a processor; and
a memory device comprising a set of instructions which, if executed by a processor, cause a computer to:
detect a motion of one or more of a user or an object;
capture a video feed of the motion;
analyze the video feed according to a predetermined characteristic of the motion, including measuring an object motion measurement and generating an object motion metric utilizing the object motion measurement; and
play back a modified video feed of the motion, wherein the modified video feed is to include a visual representation of at least one of the predefined characteristic of the motion, the object motion measurement and the object motion metric, wherein a user motion measurement and a user motion metric are obtained from the captured video feed and are compared to optimal motion measurements and optimal motion metrics for one or more of a body type, a height or a weight of the user, and an optimal indicator is generated based on a result of the comparing, wherein analyzing the video feed according to the predefined characteristic of the motion includes differentiating between a major motion that is involved in the generating of the object motion metric and a minor motion that is not involved in the generating of the object motion metric, wherein a remote data store is to be accessed to obtain parameters to supplement a determination of a consistency ratio of the motion of the object, wherein a motion analysis application update is to be downloaded from a remote database, and wherein the user motion measurement is to include a base line distance, a first motion portion distance representing a first motion of the user, and a second motion portion distance representing a second motion of the user, wherein a first motion ratio is to be calculated based on the base line distance and the first motion portion, and wherein a second motion ratio is to be calculated based on the base line distance and the second motion portion.

24. The system of claim 23, wherein analyzing the video feed according to the predefined characteristics of the motion further includes differentiating between a major object and a minor object.

25. The system of claim 23, wherein analyzing the video feed according to the predefined characteristic of the motion further includes recognizing a motion point.

26. The system of claim 23, wherein the set of instructions further cause the computer to upload at least one of the video feed, the object motion measurement, the object motion metric, and the modified video feed to the remote database.

* * * * *

UNITED STATES PATENT AND TRADEMARK OFFICE
CERTIFICATE OF CORRECTION

PATENT NO. : 9,607,399 B2
APPLICATION NO. : 13/997059
DATED : March 28, 2017
INVENTOR(S) : Gary M. Behan et al.

It is certified that error appears in the above-identified patent and that said Letters Patent is hereby corrected as shown below:

In the Claims

In Column 15, Line number 48, in Claim 15, replace "application," with -- application --

Signed and Sealed this
Thirtieth Day of January, 2018

Joseph Matal
*Performing the Functions and Duties of the
Under Secretary of Commerce for Intellectual Property and
Director of the United States Patent and Trademark Office*